United States Patent [19]
Place

[11] 3,930,613
[45] Jan. 6, 1976

[54] CHECK VALVE HAVING TEMPERATURE RESPONSE

[75] Inventor: Donald E. Place, Mansfield, Ohio

[73] Assignee: Therm-O-Disc Incorporated, Mansfield, Ohio

[22] Filed: Oct. 18, 1974

[21] Appl. No.: 515,834

[52] U.S. Cl............... 236/48 R; 137/519; 236/101; 236/87; 251/75
[51] Int. Cl.²......................................... G05D 23/10
[58] Field of Search............... 236/101, 87, 48 R, 81; 251/75; 137/519; 123/117 A

[56] References Cited
UNITED STATES PATENTS

| | | | |
|---|---|---|---|
| 1,848,031 | 3/1932 | Spencer...................... | 236/101 E X |
| 1,923,882 | 8/1933 | Pickup.......................... | 236/101 E |
| 2,585,863 | 2/1952 | Smith............................ | 251/75 X |
| 3,450,342 | 6/1969 | Arledge, Jr...................... | 236/93 X |
| 3,704,697 | 12/1972 | Weymann..................... | 123/117 R X |
| 3,734,403 | 5/1973 | Eshelman et al..................... | 236/87 |
| 3,856,259 | 12/1974 | Doherty, Jr...................... | 251/75 X |

Primary Examiner—Carroll B. Dority, Jr.
Assistant Examiner—William E. Tapolcai, Jr.
Attorney, Agent, or Firm—McNenny, Farrington, Pearne & Gordon

[57] ABSTRACT

A thermally sensitive check valve is disclosed in which a bimetallic snap disc functions in one position as the check valve element and in another position to either maintain the valve open as in one illustrated embodiment, or to maintain the valve closed as illustrated in another embodiment. By combining the check valve function and the valving function in a single bimetallic snap disc, a simple and reliable device is provided.

16 Claims, 8 Drawing Figures

CHECK VALVE HAVING TEMPERATURE RESPONSE

BACKGROUND OF THE INVENTION

This invention relates generally to thermally responsive check valves and more particularly to a novel and improved device of such type employing a bimetal snap disc as the temperature sensing and as the check valve element.

PRIOR ART

Thermally responsive bimetallic actuated valves are known. Examples of such devices are illustrated in the U.S. Pat. Nos. 1,944,369; 3,444,847; 3,459,163; 3,506,194; 3,704,697; and 3,744,716. It has also been known to utilize a bimetal snap disc valve in series with separate check valve means. The operation of the bimetallic disc, upon reaching its operating or calibration temperature, functions to allow flow of fluid in both directions. Before such operation of the check valve mechanism such device allows flow in only one direction. Such devices are sometimes used with internal combustion engines to change the operation of the engine when predetermined engine temperatures are reached.

SUMMARY OF THE INVENTION

In accordance with the present invention, a device is provided in which a bimetal snap disc operates in one position as a check valve element to allow flow in only one direction. However, after operation of the disc resulting from its reaching its operating temperature, the disc either allows flow in both directions, as in one illustrated embodiment, or prevents flow in both directions, as illustrated in another embodiment. Since the disc functions both as a check valve element and as the temperature responsive valving element, this valve can be simple in structure while maintaining reliability.

DETAILED DESCRIPTION OF THE DRAWINGS

Figure 1:
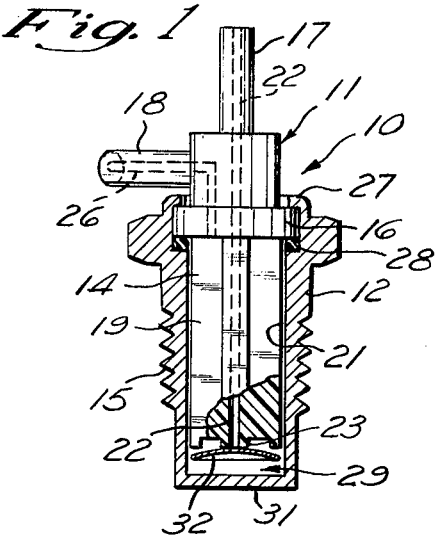
FIG. 1 is a side elevation partially in longitudinal section of one preferred form of a thermally responsive check valve incorporating the present invention.
Figure 2:
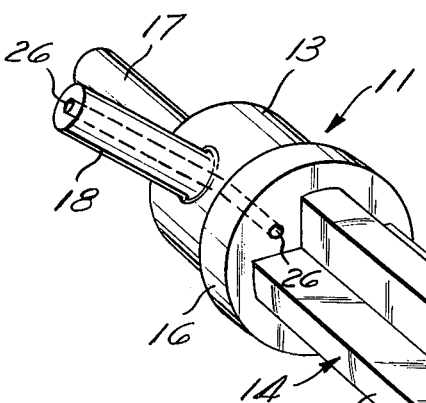
FIG. 2 is an enlarged perspective view of the center member of the body assembly.

The embodiment of this invention illustrated in FIGS. 1 through 4 includes a body assembly 10, consisting of a central body member 11 and a cup shaped body member 12. The central body member 11 is preferably molded from a plastic material such as a phenolic resin and has a shape as illustrated in FIG. 2. This body member has a central cylindrical section 13, a lower extension 14 and an intermediate flange section 16. Projecting from the central section 13 are a pair of nipples 17 and 18, each of which is adapted to fit into a hose or the like for connection of the valve to the associated system. The body member 12 is formed with external threads 15 for mounting the assembled device.

The lower extension section 14 is provided with four symmetrically located axially extending projections 19, proportioned to closely fit into a main bore 21, formed in the body member 12. A central passage 22 extends through the nipple 17 and along the section 14 and is open at its end through a valve seat projection 23. Formed at the extremities of the projections 19, are stop surfaces 24, which are radially spaced from the valve seat projection 23 and are preferably in substantial radial alignment therewith. A port 26 extends through the nipple 18 and is opened through the flange 16 between two of the projections 19.

When assembled, the body member 11 extends into the bore 21 of the body member 12 and is permanently mounted by turning a web 27 over the shoulder 16. An elastomeric seal 28 is positioned under the shoulder 16 to provide a fluid tight joint between the two body members 11 and 12.

The two body members 11 and 12 cooperate to define a valve chamber 29 between the inner end of the body member 11, and an end wall 31 on the body member 12. The port 22 is open to the valve chamber 29 through the seat 23 and the port 26 is in communication with the valve chamber 29 because it is open to a zone between the adjacent projections 19.

Positioned in the valve chamber 29 is a bimetal snap disc 32 which is movable with snap action between two positions of stability, upon reaching predetermined calibration or operating temperatures. When the snap disc 32 is in its first position of stability, illustrated in FIGS. 1 and 3, it functions as a check valve element to allow flow from the port 22 into the chamber 29 and therefrom through the port 26, but prevents flow in the opposite direction from the chamber 29 to the port 22.

Figure 3:
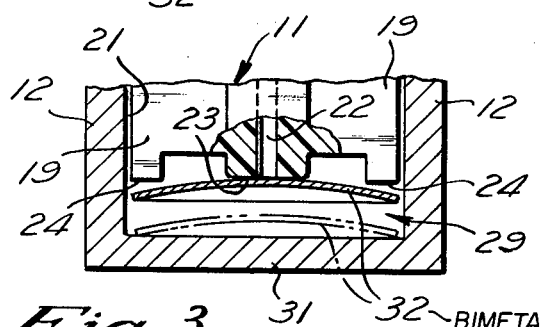
FIG. 3 is an enlarged fragmentary section illustrating the check valve of FIG. 1 with the disc illustrated in full line and in the position it assumes when seated to prevent reverse flow and in phantom in the position it assumes for flow in the opposite direction.

In FIG. 3, the snap disc 32 is illustrated in full line in its closed position in which it is seated against the valve seat 23 to prevent flow from the chamber 29 into the port 22. In that same Figure, the snap disc is illustrated in phantom resting against the end wall 31 and spaced from the valve seat 23. This is the position the bimetal snap disc assumes when the pressure in the port 22 exceeds the pressure in the chamber 29 and flow occurs from the port 22 into the chamber 29. The bimetal snap disc moves from the phantom position to the full line closed position only when the pressure in the chamber 29 exceeds the pressure in the port 22 and creates sufficient flow from the chamber 29 into the port 22 to cause the snap disc to lift up into engagement with the valve seat, and thereafter will remain in the seated position only so long as the pressure in the chamber 29 exceeds the pressure within the chamber 22 by an amount sufficient to overcome the weight of the bimetal snap disc so as to maintain the disc in the seated position. Preferably the disc is small, having a diameter in the order of one-half inch, so its weight is sufficiently small to allow it to be lifted up to the seat by relatively low flow rates. In the drawings the clearance illustrated in FIG. 3 between the phantom line position of the disc 32 and the valve seat 23 is exaggerated for purposes of illustration, but must be sufficiently small to insure that flow toward the port 22 will pick up the disc and cause it to close against the valve seat. In instances in which it is required to insure that the disc seats to absolutely prevent any flow from the chamber 29 into the port 22, a very light spring may be provided between the disc 22 and the end wall 31 to overcome the effect of gravity and to maintain contact of the disc with the seat when the pressures of the port 22 and chamber 29 are equal. Conversely, the valve can be mounted in an inverted position to utilize gravity for this function, as illustrated in the embodiment of FIGS. 5 and 6.

Figure 4:
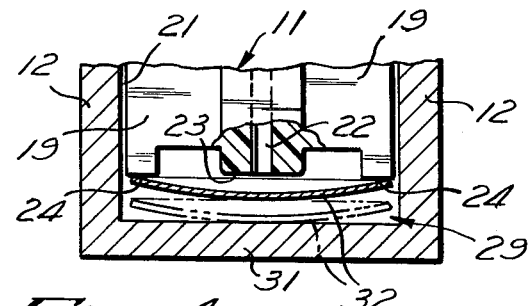
FIG. 4 is a fragmentary section similar to FIG. 3 but illustrating the disc in its operated position in which it allows flow in both directions through the valve.

Referring to FIG. 4, whenever the bimetal snap disc 32 reaches its operating temperature, it snaps through to the operated position illustrated in FIG. 4. In such position, the disc cannot engage the valve seat regardless of the pressure relationship and the valve is open for flow in both directions in this position. Seating of the disc against the valve seat is prevented because the periphery of the disc engages the surfaces 24 on the body member 11 before the central portion of the disc can engage the valve seat 23. In FIG. 4, the disc is illustrated in full line in the position in which its periphery is seated against the surface 24 and in phantom in the position which it rests against the end wall 31. In either position, the disc is incapable of contacting the valve seat so the valve is maintained open.

In practice, the end surfaces 24 are located substantially in radial alignment with the valve seat 23 so that clearance is provided between the periphery of the disc and the surfaces 24 when the disc is in the check valve position of FIG. 3. This insures that the disc can be seated against the valve seat for proper check valve operation. In the operated position, however, the periphery engages the stop surfaces to prevent contact between the disc and the valve seat.

Figure 5:
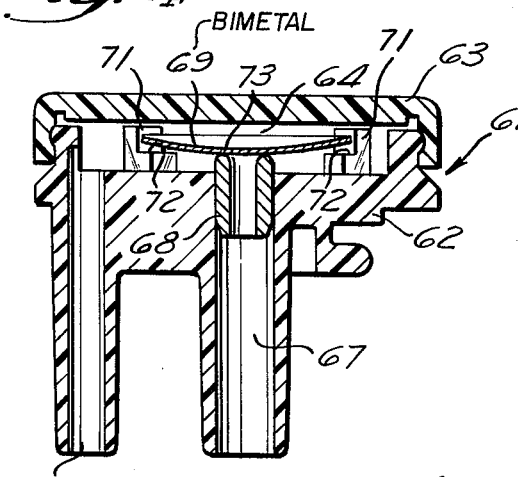
FIG. 5 is a side elevation of the modified thermally responsive check valve in accordance with the present invention.
Figure 6:
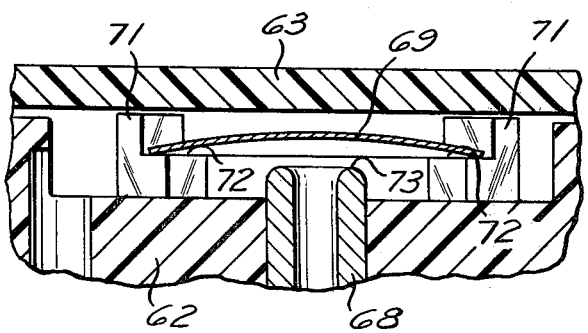
FIG. 6 is an enlarged fragmentary section of the valve illustrated in FIG. 5 showing the disc in the position it assumes when the valve is maintained open.

FIGS. 5 and 6 illustrate a modified form of valve, which is, again, constructed to provide check valve operation when the disc is in one position and to allow flow through the valve in both directions when the disc operates. In this embodiment, the body assembly 61 includes a main body element 62 and a cap member 63, both of which are formed of a phenolic resin or the like. The two elements 62 and 63 cooperate to define a valve chamber 64 in communication with a pair of ports 66 and 67. A tubular valve seat member 68 is positioned in the ports 67 with a press fit. A snap disc formed of bimetal 69 is laterally located in the valve chamber 64 by a plurality of symmetrically positioned stop projections 71 having a stepped shape to provide stop surfaces 72, substantially radially aligned with the valve seat 73, provided by the valve seat element 68.

When the snap disc 69 is in the position illustrated in FIG. 5, it normally rests against and seats with the valve seat 73 to allow flow only in a direction from a port 67 to the valve chamber 64. In such position, clearance is provided between the periphery of the disc and the stop surfaces 72.

When the disc snaps through to its operated position, as illustrated in FIG. 6, the engagement between the periphery of the disc 69 and the stop surfaces 72 prevents engagement of the central portion of the disc with the valve seat 73 and the valve is maintained in the opened position. In this instance, the effect of gravity maintains the disc against the valve seat when the disc is in the check valve position of FIG. 5. Because the disc is normally maintained in this embodiment against the valve seat, reverse flow from the valve chamber into the port 67 is absolutely prevented.

Further, in this embodiment, the valve seat element 68 is moved with respect to the body member 62 along the port 67 until it is properly positioned with respect to the stop surface 72. This permits gaging of the device to insure proper snap operations and to insure that the disc can properly seat on the valve seat. In practice, the valve seat member is positioned with respect to the stop surfaces 72 so that it is below the plane of the stop surfaces 72, by a distance substantially less than the cord height of the disc. The position of the valve seat member 68 can be maintained by an interference friction fit or, if desired, a suitable adhesive can be utilized to lock the valve seat member in its gaged position.

Figure 7:
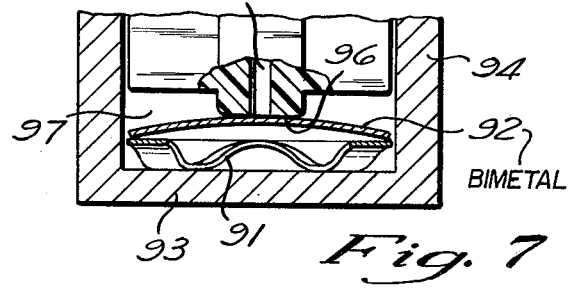
FIG. 7 is an enlarged fragmentary section of a second modified form of this invention in which the disc operates as a check valve in one position, and operates to prevent flow through the valve in both directions in its other position with the disc illustrated in the latter position; and, FIG. 8 is a fragmentary section similar to FIG. 7 illustrating the embodiment of FIG. 7 with the disc in the position for check valve operation.
Figure 8:
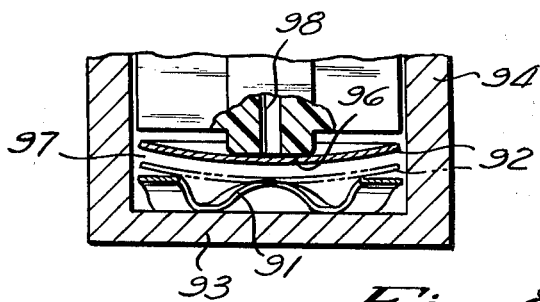

FIGS. 7 and 8 illustrate a modified form of this invention in which a valve construction very similar to that illustrated in FIGS. 1 through 4 is utilized, but the valve is arranged so that it prevents flow in both directions when the disc has operated. In this embodiment, a wave washer type spring 91 is positioned between a bimetal snap disc 92 and an end wall 93, in the cup shaped body member 94. The various elements are proportioned and gaged so that when the bimetal snap disc 92 is in the position of FIG. 7, it is maintained in engagement with the valve seat 96 with sufficient force to prevent flow between the valve chamber 97 and the port 98 in both directions.

When the snap disc 92 reaches its operating temperature and snaps through to the position of FIG. 8, the check valve function is provided. In this disc position, the disc 92 moves to its full line position in engagement with the valve seat 96 when the pressure in the chamber 97 exceeds the pressure in the port 98 by sufficient value, to move the disc to its seated position and to maintain the disc in such seated position. Whenever the pressure in the port 98 exceeds the pressure in the chamber 97, the disc moves to its phantom line position, allowing flow from the port 98 to the chamber 97. The wave washer 91 is proportioned to allow the discs to move away from the seat when the disc is in its check valve position, but to maintain the disc in engagement with the seat when the disc is in the operated position of FIG. 7. The use of a wave washer in this embodiment permits the manufacture of the device without excessively close tolerances. However, the structure can be modified to eliminate the need of the wave washer by positioning the end wall 93 with respect to the valve seat so that the engagement of the disc periphery with the end wall maintains the disc against the seat. Such an arrangement, however, requires more precise gaging of the relative position between the valve seat and the end wall 93.

It is recognized that in this form of the present invention, the valve functions to prevent flow from the port 98 toward the chamber 97 only when the pressure differential therebetween is sufficiently low to prevent the disc from being moved away from the valve seat. Since the disc is a form of spring and can be mechanically displaced from its operated position, the amount of differential pressure that can be sealed is limited to the amount of force with which the disc is biased toward the valve seat. It is, therefore, preferable in this embodiment to utilize a relatively small diameter port so that the affect of pressure will be minimized and to arrange the structure so that the disc seats against the valve seat adjacent to the port in its operated position. On the other hand, for check valve operation it is preferable that the valve seat have a larger effective diameter. Therefore, the valve seat is provided with a relatively flat end wall to insure seating on a larger diameter when the disc is in the position of FIG. 8.

With the various forms of the present invention, a bimetal snap element functions both as a check valve element and as a valving element. In one position of the bimetal snap disc, flow from the chamber to the central port is prevented, while reverse flow is allowed. In the other position, or operated position of the disc, the valve is maintained open as illustrated in the embodiments of FIGS. 1 through 4 and 5 and 6, or is maintained closed as illustrated in the embodiment of FIGS. 7 and 8. In all embodiments, a very simple, but effective temperature responsive check valve is provided.

Although preferred embodiments of this invention are illustrated, it should be understood that various modifications and rearrangements of parts may be resorted to without departing from the scope of the invention disclosed and claimed herein.

What is claimed is:

1. A thermally responsive check valve comprising a body assembly providing a chamber open for flow of fluid therethrough and a port open to said chamber through a valve seat, a bimetallic snap disc in said chamber movable with snap action between first and second positions upon reaching predetermined operating temperatures, said disc in said first position operating as a check valve and being movable into and out of engagement with said valve seat to allow flow only from said port to said chamber, said disc in said second position terminating said check valve operation and rendering said valve in the same condition with respect to flow in both directions through said valve seat.

2. A thermally responsive check valve as set forth in claim 1 wherein said body assembly provides means to maintain said snap disc spaced from said valve seat when said snap disc is in said second position.

3. A thermally responsive check valve as set forth in claim 2 wherein said means includes stop surfaces engageable with the periphery of said disc when said disc is in said second position.

4. A thermally responsive check valve as set forth in claim 3 wherein said stop surfaces are symmetrically positioned around said disc and are substantially coplanar with said valve seat.

5. A thermally responsive check valve as set forth in claim 4 wherein said valve assembly is shaped to maintain said disc substantially coaxial with said valve seat and said stop surfaces are spaced from the periphery of said disc when said disc is in engagement with said valve seat and in said first position.

6. A thermally responsive check valve as set forth in claim 5 wherein said disc when in said first position is normally spaced from said valve seat and is movable into engagement with said valve seat by fluid flow from said chamber to said port.

7. A thermally responsive check valve as set forth in claim 2 wherein said disc when in said first position normally engages said valve seat and is moved from said valve seat when the pressure in said port exceeds the pressure in said chamber.

8. A thermally responsive check valve as set forth in claim 1 wherein said valve seat is provided with tubular elements positioned within said port and which is movable with respect to said first port to locate said valve seat in the desired position within said chamber.

9. A thermally responsive check valve as set forth in claim 1 wherein said body assembly provides means to maintain said snap disc in engagement with said valve seat when said snap is in said second position.

10. A thermally responsive check valve as set forth in claim 9 wherein said means to maintain said snap disc in engagement with said valve seat is a spring engageable with the periphery of said disc on the side thereof opposite said valve seat.

11. A thermally responsive check valve as set forth in claim 10 wherein said spring allows free movement of said disc away from said valve seat when said disc is in said first position.

12. A thermally responsive check valve as set forth in claim 11 wherein said spring is a wave washer.

13. A thermally responsive check valve as set forth in claim 9 wherein said valve seat is shaped to be engaged by said disc at a first diameter when said disc is in said second position and is engaged by said disc at a second diameter smaller than said first diameter when said disc is in said first position.

14. A thermally responsive check valve comprising a body assembly defining a valve chamber and providing first and second ports open to said chamber with a circular valve seat around said first port, a bimetal snap disc in said chamber movable with snap action between first and second positions of stability upon reaching predetermined operating temperatures, said disc in said first position of stability providing check valve operation by engaging said seat and preventing flow from said chamber into said first port when the pressure in said chamber exceeds the pressure in said first port and being unseated and allowing flow from said first port to said chamber when the pressure in said first port exceeds the pressure in said chamber, movement of said disc to said second position terminating said check valve operation.

15. A thermally responsive check valve as set forth in claim 14 wherein means are provided preventing engagement between said disc and seat when said disc is in said second position to maintain said valve open.

16. A thermally responsive check valve as set forth in claim 14 wherein means are provided to maintain engagement between said disc and seat when said disc is in said second position to maintain said valve closed.

* * * * *